Nov. 12, 1929.   M. J. ALDRICH ET AL   1,735,712
SAFETY SUMP ATTACHMENT FOR CARBURETORS
Filed Oct. 31, 1927
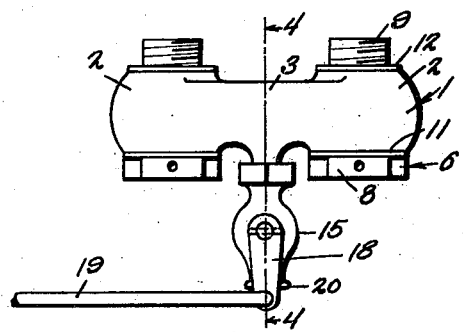
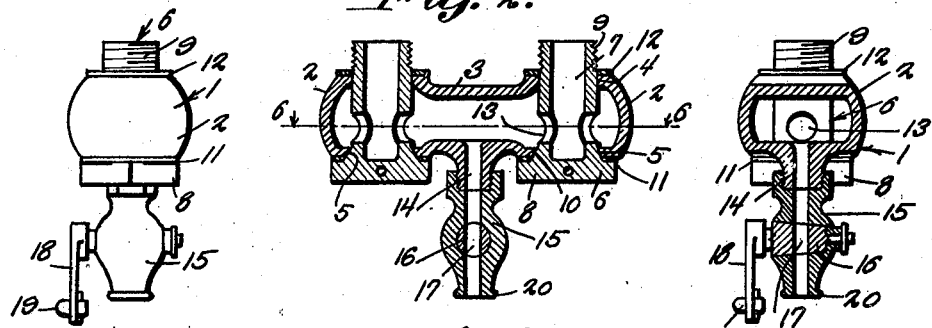
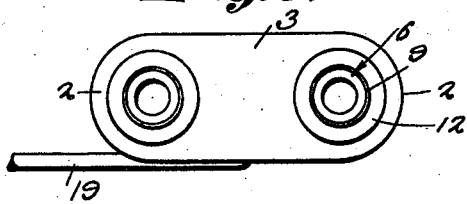
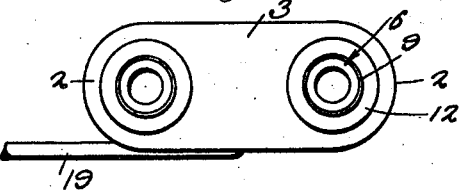
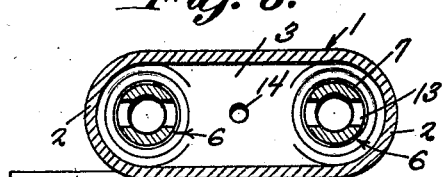
Mark J. Aldrich,
Dale A. Seitz, and
Kenneth E. Gabbert,   INVENTORS.
BY Richard B. Owen
      ATTORNEY.

Patented Nov. 12, 1929

1,735,712

UNITED STATES PATENT OFFICE

MARK J. ALDRICH, OF KEOKUK, IOWA, AND DALE A. SEITZ AND KENNETH E. GABBERT, OF KANKAKEE, ILLINOIS

SAFETY SUMP ATTACHMENT FOR CARBURETORS

Application filed October 31, 1927. Serial No. 230,057.

This invention relates to the fuel supply systems for internal combustion engines, and while designed primarily for installation in connection with the carburetors of internal combustion engines upon motor driven aircraft, such as aeroplanes and dirigible balloons, may equally well find embodiment in internal combustion engines which are employed in connection with automobiles, motor boats, locomotives, submarines, etc., as well as being adapted for use in connection with stationary combustion engines.

The hazards incident to misfiring or other failure of proper functioning of the internal combustion engines of aircraft and particularly aeroplanes, are well recognized. Such misfiring or other failure to properly function is ordinarily due to clogging of the fuel feed of the carburetors or the accumulation of water in the carburetors, and therefore the present invention has as its primary object to provide a sump for installation in connection with the fuel feed of internal combustion engines of the general class referred to, and novel means associated with the sump and operable to effect practically instantaneous draining of the well of the carburetor so that the fuel therein which may be contaminated with solid particles of foreign matter or with water, may be practically immediately discharged from the well of the carburetor, permitting a fresh supply of clean fuel to the carburetor.

Another object of the invention is to provide a sump and means associated therewith for effecting draining of the carburetor with which the sump is associated, so that the hazards incurred by fire may be avoided.

Another object of the invention is to so construct the sump and the drain valve which is associated therewith, that the device as a whole may be readily installed upon any of the standard carburetors employed upon aircraft and the like, and conveniently and readily operated from the pilot's cockpit of the aeroplane or other aircraft, the operating means being preferably controlled by a lever, or a push or pull plunger, upon the control board of the aeroplane.

While the accompanying drawings and the description which is to follow, constitute a disclosure of the preferred embodiment of the invention, it will be understood that various changes may be made within the scope of what is claimed.

In the accompanying drawings:

Fig. 1 is a view in side elevation of the sump embodying the invention;

Fig. 2 is a vertical longitudinal sectional view through the sump, the drain valve thereof being shown in open position;

Fig. 3 is an end elevation of the sump;

Fig. 4 is a vertical transverse sectional view taken substantially on the line 4—4 of Figure 1 looking in the direction indicated by the arrows;

Fig. 5 is a plan view of the sump attachment;

Fig. 6 is a horizontal sectional view taken substantially on the line 6—6 of Figure 2 looking in the direction indicated by the arrows.

The attachment embodying the invention comprises a sump or accumulating chamber indicated in general by the numeral 1 and comprising, preferably, two relatively laterally displaced bowls 2 and a connecting neck 3 which extends between the bowls, these parts being preferably integrally cast, and each bowl being provided in its top with an opening 4 and in its bottom with a preferably conical opening 5 which is of slightly greater diameter than the opening 4. The numeral 6 indicates in general an accumulating and retaining nipple which is associated with each bowl 2, and each of these nipples comprises a tubular body 7 closed at its lower end by a head 8, preferably of polygonal contour, to adapt it for the application thereto of a wrench, the body 7 of each nipple being fitted upwardly through the openings 5 and 4 in the respective bowl as clearly shown in Figure 2 of the drawings. The upper end of each nipple 6 is exteriorly threaded as indicated by the numeral 9 and the body 7 of each nipple, near its juncture with the head 8, is exteriorly of conical form as indicated by the numeral 10, so as to adapt this portion of the body of each nipple to snugly fit in the conical opening 5 in the respective bowl 2, a gasket 11 being arranged upon this portion of the body of the nipple, and being confined between the head 6 and the under side of the bottom of the respective bowl, so that a fluid-tight connection is provided at this point. The upper portion of the body 7 of each accumulating and retaining nipple is snugly fitted through the opening 4 of the respective bowl and the threaded upper end of the body is fitted into a threaded opening in the bottom of the well of the carburetor or carburetors in connection with which the sump attachment is installed, gaskets 12 being arranged upon the projecting upper ends of the bodies 7 of the nipples so as to be confined between the upper sides of the bowls 2 and the under side of the bottom of the carburetor with which the nipples are placed in communication, it being understood that a wrench may be applied to the heads 6 of the nipples and the nipples rotated so as to thread them into the threaded openings in the well or wells of the carburetor or carburetors. The bore of the body of each nipple is placed in communication with the interior of the respective bowl 2, through the medium of openings 13 which are formed in the body of the nipple immediately above the head 6 and which are preferably located at diametrically opposite points, so that gasoline or other motive fluid may enter the sump 1 and fill the bowls 2 and connecting neck 3 thereof, by way of the nipples 7 and the openings 13 in the walls thereof. At this point it will be evident that inasmuch as the sump is installed upon the underside of the well of the carburetor or carburetors, and likewise inasmuch as any solid particles of foreign matter or any water mixed with the gasoline or other fuel, will be of greater specific gravity than the fuel, such particles or the water will settle into the sump and be collected and retained therein, the pure or uncontaminated fuel remaining in the well of the varburetor.

In order that the accumulated particles of foreign matter or the accumulated water may be discharged from the sump, from time to time as occasion may require, or in order that the carburetor well may be completely drained, in the event of fire, the neck 3 of the sump is provided upon its under side and midway between the bowls 2 of the sump, with a downwardly projecting exteriorly threaded nipple 14 to which is fitted the upper end of the casing 15 of a rotary cutoff valve 16, the port or passage of which valve is indicated by the numeral 17. The numeral 18 indicates an actuating arm which is fixed to the projecting stem of the valve 16, and an actuating rod 19 is connected to the end of the arm 18 and is led to the control board within the cockpit of the aeroplane or other aircraft, or to any other point where it may be conveniently actuated by the pilot, any suitable means, such for example as a lever, or a push or a pull plunger, being employed in connection with the rod for actuation of the same.

From the foregoing description of the invention it will be obvious that, by actuating the rod 19 and swinging the arm 18 to open the valve 16, the motive fluid which is contaminated with particles of foreign matter or with water and which has accumulated within the sump, may be practically instantly drained from the sump, this operation of the valve being effected at the instant there is any indication of improper or inadequate feed of fuel to the motor. It will be understood of course that a pipe or other form of conduit may be connected with the delivery end 20 of the cutoff valve casing 15 so as to conduct the fuel to a point where it may be discharged with safety and without risk of ignition.

It will be evident from the foregoing description of the invention that the valve 16 may be opened at any time without in any way interrupting the functioning of the motor as for example while the aeroplane is in full flight, with the motor operating at any speed, or idling; while the aeroplane or other aircraft is at rest, with the motor in operation or idle; and, while the aeroplane or other craft is in motion upon land, water, or in any stage of take-off or landing and whether the motor is functioning or not.

In the use of the appliance, the valve 16 is opened through operation of the rod 19, in the manner previously explained, and at the first indication of any motor trouble, and is permitted to remain open for the period of a few seconds whereupon the rod 19 is again operated but in a reverse direction, so as to close the valve, the contaminated motive fluid having been, in the interval, drained completely from the sump.

It will be evident that the accumulating and retaining nipples 6 are so assembled with the bowls 2 of the sump 1 as to permit of convenient disassemblage of the parts and a thorough cleansing of the same, after the device has been in use for a considerable period of time, although it will likewise be evident that the construction is such that there is little likelihood of clogging of the device through the accumulation of foreign matter therein.

Having thus described the invention, what we claim is:

1. A carburetor attachment for the purpose stated comprising a sump chamber having openings in its top and bottom walls, a nipple including a hollow tubular body fitted through said openings and having an opening in its wall establishing communication between its bore and the interior of the sump chamber, the nipple having its upper end projecting above the sump chamber for connection to the well of a carburetor by way of an opening in the bottom of said well, and a drain valve in the bottom of the sump chamber.

2. A carburetor attachment for the purpose stated comprising a sump chamber having openings in its top and bottom walls, a nipple including a hollow tubular body fitted through said openings and having an opening in its wall establishing communication between its bore and the interior of the sump chamber, the nipple having its upper end projecting above the sump chamber for connection to the well of a carburetor by way of an opening in the bottom of said well, and a drain valve in the bottom of the sump chamber, the nipple being provided at its lower end with a head and having its body, adjacent its juncture with the head, exteriorly conical, the opening in the bottom of the sump chamber being of conical form to snugly accommodate the conical portion of the body of the nipple, and a gasket interposed between the bottom of the sump chamber and the upper side of the said head of the nipple.

3. A carburetor attachment for the purpose stated comprising a sump chamber including laterally relatively displaced bowls and a connecting neck establishing communication between the bowls, an accumulating and retaining nipple associated with each bowl and in communication therewith, the upper ends of the nipples projecting above the respective bowls and constituting means for attaching the sump chamber to, and in communication with, the well of a carburetor, and a drain valve leading from the bottom of the neck of the sump chamber.

4. A carburetor attachment for the purpose stated comprising a sump chamber having alined openings in its top and bottom walls, a nipple including a hollow cylindrical body removably fitted in said openings, the body having a head at its lower end and at its upper end projecting above the sump chamber and being threaded for connection with the well of a carburetor, the body being provided with diametrically opposite openings in its wall establishing communication between the interior of the body and the sump chamber, and a drain valve in the bottom of the sump chamber.

In testimony whereof we affix our signatures.

MARK J. ALDRICH.
DALE A. SEITZ.
KENNETH E. GABBERT.